US007578358B2

(12) United States Patent
Hess et al.

(10) Patent No.: US 7,578,358 B2
(45) Date of Patent: Aug. 25, 2009

(54) HAND-HELD HAMMER DRILL

(75) Inventors: Achim Hess, Korb (DE); Stefan Pohl, Waiblingen (DE); Markus Wörner, Winnenden (DE); Hans Klöpfer, Waiblingen (DE)

(73) Assignee: AEG Electric Tools GmbH, Winnenden (DE)

( * ) Notice: Subject to any disclaimer, the term of this patent is extended or adjusted under 35 U.S.C. 154(b) by 52 days.

(21) Appl. No.: 11/971,944

(22) Filed: Jan. 10, 2008

(65) Prior Publication Data

US 2008/0164041 A1 Jul. 10, 2008

(30) Foreign Application Priority Data

Jan. 10, 2007 (DE) ...................... 10 2007 001 494

(51) Int. Cl.
*B23B 45/16* (2006.01)
*B25D 11/10* (2006.01)

(52) U.S. Cl. ......................... 173/109; 173/48; 173/201

(58) Field of Classification Search ................... 173/48, 173/109, 114, 104, 201, 205
See application file for complete search history.

(56) References Cited

U.S. PATENT DOCUMENTS

| | | | | |
|---|---|---|---|---|
| 4,719,976 | A * | 1/1988 | Bleicher et al. | 173/109 |
| 4,732,217 | A * | 3/1988 | Bleicher et al. | 173/104 |
| 5,036,925 | A * | 8/1991 | Wache | 173/48 |
| 5,277,259 | A * | 1/1994 | Schmid et al. | 173/13 |
| 5,320,177 | A * | 6/1994 | Shibata et al. | 173/48 |
| 5,373,905 | A * | 12/1994 | Bleicher et al. | 173/109 |
| 5,787,996 | A * | 8/1998 | Funfer | 173/104 |
| 6,035,945 | A * | 3/2000 | Ichijyou et al. | 173/48 |
| 6,138,772 | A * | 10/2000 | Miescher et al. | 173/93.5 |
| 6,192,996 | B1 * | 2/2001 | Sakaguchi et al. | 173/48 |
| 6,666,284 | B2 * | 12/2003 | Stirm | 173/97 |
| 7,070,008 | B2 * | 7/2006 | Baumann et al. | 173/48 |
| 2004/0003931 | A1 | 1/2004 | Mueller et al. | |

FOREIGN PATENT DOCUMENTS

| | | | |
|---|---|---|---|
| DE | 3503507 | A1 | 8/1986 |
| DE | 4216808 | A1 | 11/1993 |
| EP | 0 589 337 | B1 | 8/1996 |
| GB | 2381228 | A | 4/2003 |
| WO | 8911955 | A | 12/1989 |

* cited by examiner

*Primary Examiner*—Scott A Smith
(74) *Attorney, Agent, or Firm*—Gudrun E. Huckett

(57) ABSTRACT

A hand-held hammer drill has a housing, a tool spindle rotatingly driving a tool, a hammer action percussion-driving the tool, a swash plate drive driving the hammer action, and a countershaft driving as needed the tool spindle and the hammer action. A first bearing and an axial bearing are provided. The hub is rotatably supported in a cantilevered arrangement by the first bearing in the housing and coaxially surrounds the countershaft. The hub has a free cantilevered end and the axial bearing is disposed on the free cantilevered end, wherein the axial bearing axially supports the countershaft and has radial play relative to the countershaft.

6 Claims, 2 Drawing Sheets

HAND-HELD HAMMER DRILL

BACKGROUND OF THE INVENTION

The invention relates to a hand-held hammer drill comprising a tool spindle for driving in rotation a tool, a hammer action providing a percussion driving action for the tool, a swash plate drive for driving the hammer action, a countershaft for driving, as needed, the tool spindle and the hammer action, as well as a housing. The hub of a swash plate drive is rotatably supported in a cantilevered arrangement by means of a first bearing in the housing and surrounds coaxially the countershaft.

Such a hammer drill is disclosed in U.S. 2004/0003931 A1, for example. The hammer drill disclosed therein comprises a tool spindle for driving in rotation a tool, a hammer action for percussion-driving the tool, a swash plate drive for driving the hammer action, as well as a countershaft for driving the tool spindle and the hammer action, as needed. The tool spindle, the countershaft, the hammer action, and the swash plate drive are arranged inside a gear housing.

The drive action of the swash plate drive produced by the countershaft and the resulting hammer action can be switched on and off as needed. In the switch-off state of the swash plate drive, the hammer action is inoperative so that only the tool spindle produces a rotating drive action of the tool clamped in the chuck; no percussion is provided. With switched-off hammer action, work can be carried out on sensitive materials such as tile or the like; the absence of percussion impulses prevents cracking of the material to be drilled.

For generating a swash plate drive action that can be switched on and off as needed, in the embodiment according to U.S. 2004/0003931 A1 the hub of the swash plate drive is rotatably supported by means of a ball bearing and a needle bearing on the countershaft. The countershaft itself is supported rotatingly in the gear housing. By means of a claw coupling, a rotating connection between the hub of the swash plate drive and the countershaft can be realized, wherein simultaneously the rotary drive and the percussion drive are active. The countershaft and its bearings are subjected to high mechanical loads and deformations caused thereby. In operation, this causes a load-dependent varying axis spacing of the loaded countershaft in comparison to the unloaded state. Input and output gears of the countershaft generate undesirable noise at the gears. Wear on bearings and gears is high. The bearings must therefore be selected to be appropriately strong. This and the opposite arrangement of the bearings requires a large amount of space.

In drilling operation with the hammer action being switched off, the claw coupling is disengaged so that at this location the torque transmission between the countershaft and the hub of the swash plate drive is interrupted. The countershaft should effect only the rotary drive action of the tool spindle while the swash plate drive supported on the countershaft should be standing still because it is not actively driven. In practice, however, it has been observed that the countershaft rotating within the hub of the swash plate drive has the tendency to entrain the hub of the swash plate drive. Tests have shown that micro-movements between the hub and the countershaft after extended operation with hammer action can cause fretting. Fretting and grease between countershaft and swash plate drive cause this entrainment effect. This effect is worsened by the elastic deformations of the countershaft under load. Despite being switched off, the swash plate drive has the tendency to be entrained. The hammer action that is thus accidentally activated can therefore spoil the drilling result in the case of sensitive work or can even cause damage to the material to be drilled.

EP 0 589 337 B1 discloses a hand-held hammer drill with a tool spindle, a rotary drive, and hammer action. The hammer action is driven by means of a swash plate drive that can be rotatingly coupled to a countershaft. The hub of the swash plate drive surrounds coaxially the countershaft and is supported in the gear housing by means of a ball bearing. In the radial direction between the hub of the swash plate drive and the countershaft, there is a further hub of a drive gear so that in the radial direction a multi-bearing arrangement is provided. In order to be able to adjust various switching conditions for the drilling and/or chipping operation, the drive gear of the countershaft as well as the countershaft itself must be axially movable. The arrangement is thus of a complex construction and resilient in the bearing area; play cannot be excluded.

SUMMARY OF THE INVENTION

It is an object of the present invention to further develop a hammerdrill of the aforementioned kind in such a way, at reduced component loading, a precise activation and deactivation of the hammer action is possible.

In accordance with the present invention, this is achieved in that a cantilevered end of the hub is provided with an axial bearing for axially supporting the countershaft, wherein the axial bearing has radial play relative to the countershaft.

A hand-held hammer drill is proposed in which the hub of the swash plate drive is rotatably supported by means of a first bearing in a cantilever arrangement in the housing and surrounds the countershaft coaxially. The free cantilevered end of the hub is provided with an axial bearing for axial support of the countershaft; the axial bearing has radial play relative to the countershaft. The cantilevered support of the hub of the swash plate drive in the housing relieves the countershaft because the operating loads acting on the swash plate drive are not introduced into the countershaft but directly into the housing. Micro-movements of the hub of the swash plate drive relative to the countershaft are reduced. Fretting is prevented. The cantilevered coaxial engagement of the countershaft by means of the hub of the swash plate drive enables a reliable pure drilling operation without the rotating countershaft in the switched-off state of the hammer action having the tendency to entrain the hub of the swash plate drive. The arrangement can be switched with high operating safety between percussion and simple rotary drilling operation. The individual components are loaded only minimally and have thus reduced wear or no detectable wear. The arrangement of the bearings requires only minimal space. The running smoothness is improved and operating noise is reduced.

The first bearing with which the hub of the swash plate drive is supported in the housing is preferably a grooved ball bearing that is embodied as a fixed bearing. With only one bearing the hub of the swash plate drive is precisely supported in the radial direction, the axial direction, and the tilt direction. With reduced expenditure, operating loads acting on the swash plate drive are reliably kept away from the countershaft.

In a preferred embodiment, the countershaft is rotatably supported by means of a second bearing in the hub of the swash plate drive. The operating loads acting in this area on the countershaft are introduced through the hub of the swash plate drive and through the first bearing into the housing. Countershaft and swash plate drive are centered precisely relative to one another. Micro-movements by elastic deformations in the bearing area and the resulting fretting are reduced further. The risk that fretting and elastic deformations of the countershaft under load have the tendency to entrain the swash plate drive is reduced. The large space required for direct support of the countershaft in the housing is no longer needed.

The first and the second bearings are advantageously arranged in a common plane that is perpendicular to the axis of rotation of the countershaft. In this area, the micro-movements, caused by the elastic deformations of the grooved ball bearing, of the swash plate drive, and of the countershaft, and the wear correlated therewith are minimized.

The hub of the swash plate drive has advantageously a continuous radial play relative to the countershaft outside of the second bearing that is positioned between the hub and the countershaft. In this way, an unwanted entrainment of the swash plate drive when carrying out only a drilling action is prevented. With the exception of the second bearing, there is no radial contact between the countershaft and the swash plate drive so that fretting and other wear-causing effects are prevented.

Different housing sections are suitable for supporting the hub of the swash plate drive. Advantageously, the gear housing that receives the swash plate drive and the countershaft is used for this purpose. The swash plate drive and the countershaft are arranged and supported spatially in a precisely defined position relative to one another. The desired decoupling of rotation and percussion movement is combined with high running smoothness over an extended period of time over the service life of the power tool.

DESCRIPTION OF THE PREFERRED EMBODIMENTS

Figure 1:
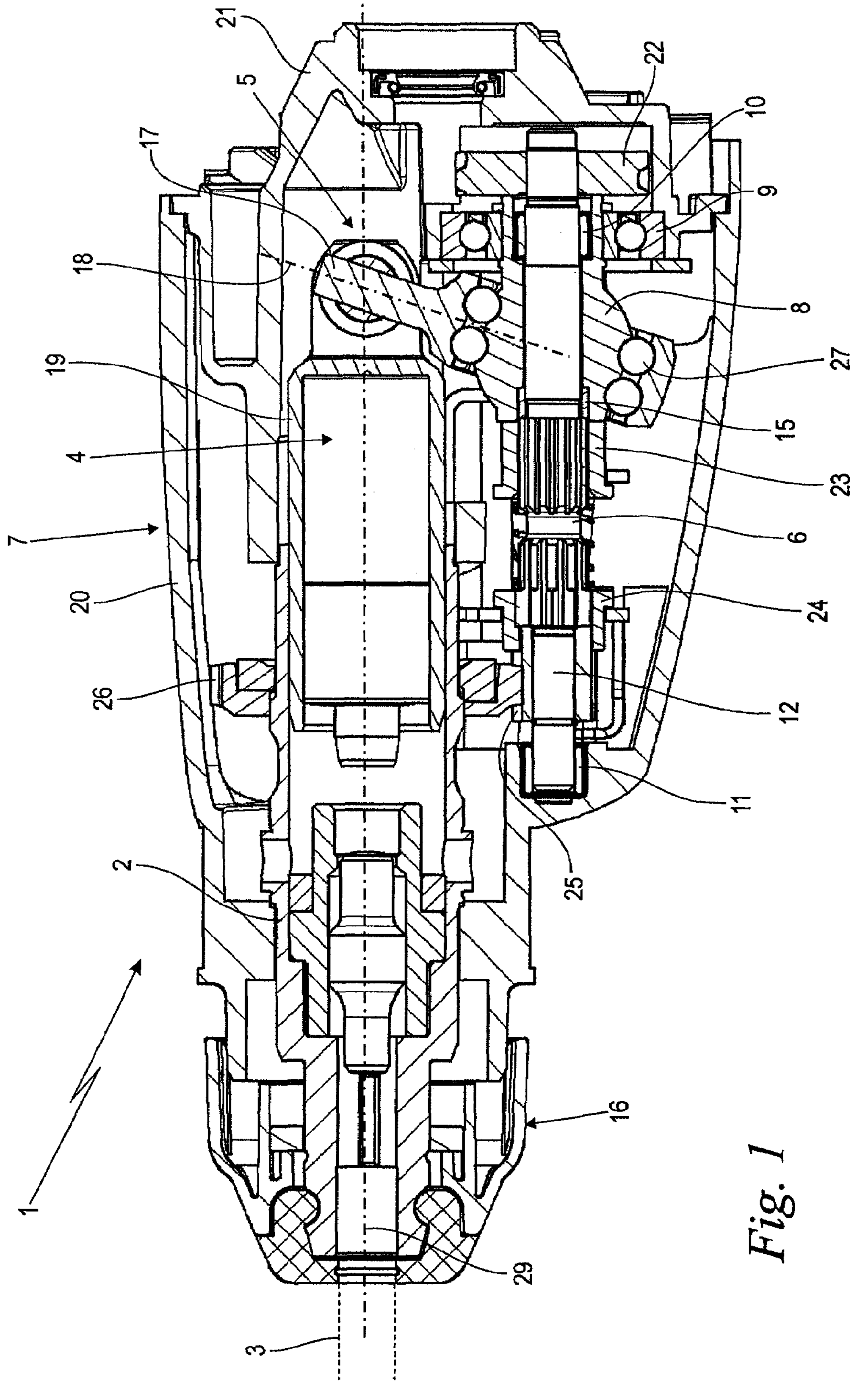
FIG. 1 is a longitudinal section illustration of a hammer drill according to the invention in the area of its gear housing.

FIG. 1 shows in longitudinal section a hammer drill 1 according to the invention in the area of its gear housing. The motor housing, handles and further components of the hammer drill 1 are not illustrated in order to simplify the drawing.

The hand-held hammer drill 1 comprises a housing 7 that forms the gear housing and is comprised of an external housing 20 and an inner housing 21 fixedly connected to the external housing 20. In the external housing 20 a tool spindle 2 rotatingly driven about axis of rotation 29 is supported; at its free end—outside of the housing 7—a chuck 16 for receiving a schematically illustrated tool 3 is attached so as to rotate with the spindle. For a rotating drive action of the tool spindle 2 a countershaft 6 having axis of rotation 12 is provided that extends parallel to the axis of the tool spindle 2 and is rotatably supported in the housing 7. At its end facing away from the chuck 16, the countershaft 6 has a gear 22 by means of which the countershaft 6 is driven in rotation by means of an electric drive motor, not illustrated. At its end facing the chuck 16, the countershaft 6 has a pinion 25 that engages a gear 26 fixedly connected to the tool spindle 2. A torque-transmitting connection between the countershaft 6 and the pinion 25 can be switched on and off, as needed, by means of an axially movable coupling sleeve 24.

The hammer drill 1 has moreover a hammer action 4 for percussion-driving the tool 3 in the direction of the axis of rotation 29. For this purpose, the tool spindle 2 is embodied at its end facing away from the chuck 16 as a hollow cylinder in which a pneumatic piston 19 is slidably guided relative to the tool spindle 2 parallel to the axis of rotation 29. By cyclic axial movement of the piston 19 the tool 3 is subjected pneumatically to axial percussion impulses; this is known in the art.

For driving the hammer action 4 a swash plate drive 5 is provided whose hub 8 surrounds coaxially the countershaft 6. On the hub 8 an annular member with integral lever 17 is supported by means of a twin-grooved ball bearing 27. It is also possible to employ a single-grooved ball bearing or a similar bearing. The axis 18 of the lever 17 together with the twin-grooved ball bearing 27 is arranged at a slant angle relative to the radial direction of the hub 8. Upon rotation of the hub 8 about the axis of rotation 12, the lever 17, that does not rotate with the hub 8, performs a a pivot movement approximately parallel to the axis of rotation 29 of the tool spindle 2 as a result of the relative swash movement. The lever 17 is connected to the piston 19. In this way, the lever 17 moves the piston 19 cyclically to and fro, and this causes the aforementioned percussion drive acting on the tool 3.

The countershaft 6 supports a coupling sleeve 23 that is fixedly secured on the countershaft for common rotation but is axially slidable thereon. By means of the coupling sleeve 23, a torque-transmitting connection between the countershaft 6 and the hub 8 of the swash plate drive 5 can be coupled and decoupled, as needed. In the coupled state, the hub 8 rotates together with the countershaft 6 so that the hammer action 4 is driven and thus active. By means of the two coupling sleeves 23, 24 different operating states can be adjusted. For performing chipping work only, the swash plate drive 5 and thus the hammer action 4 are driven while the torque transmission from the countershaft 6 to gear 26 of the tool spindle 2 is switched off so that the tool spindle 2 with the clamped tool 3 does not rotate. For drilling work on sensitive workpieces, the swash plate drive 5 and thus the hammer action 4 are switched off while only the rotating drive action of the tool spindle 2 with the clamped tool 3 is provided. Otherwise, a percussion-enhanced drilling operation (hammer drill operation) can be carried out in which by means of the coupling sleeves 23, 24 at the same time the rotating drive action of the tool spindle 2 and the operation of the hammer action 4 are realized.

The hub 8 of the swash plate drive 5 is supported by means of a first bearing 9 in a cantilevered arrangement in the housing 7 forming the gear housing, in particular, it is arranged in the inner housing 21. Instead of a support in the inner housing 21, the support can also be provided on the exterior housing 20, in a motor housing, not illustrated, or the like. The end of the countershaft 6 that is facing the chuck 16 is supported by means of a radial bearing 11 configured as a needle bearing in the outer housing 20. The end of the countershaft 6 that is facing the gear 22 is supported by means of a second bearing 10, also embodied as a needle bearing in the form of a radial bearing, in the hub 8 of the swash plate drive 5. Instead of a needle bearing, it is also possible to employ other rolling bearings or sliding bearings. Moreover, an axial bearing 15 is provided that supports the countershaft 6 parallel to the axis of rotation 12 in the direction toward the gear 22 without the countershaft 6 being contacted in the radial direction. The gear 22, in turn, acts as an axial bearing in the opposite direction. Further details of the arrangement of countershaft 6 and swash plate drive 5, in particular with regard to the aforementioned bearing arrangement, will be explained in connection with FIG. 2.

Figure 2:
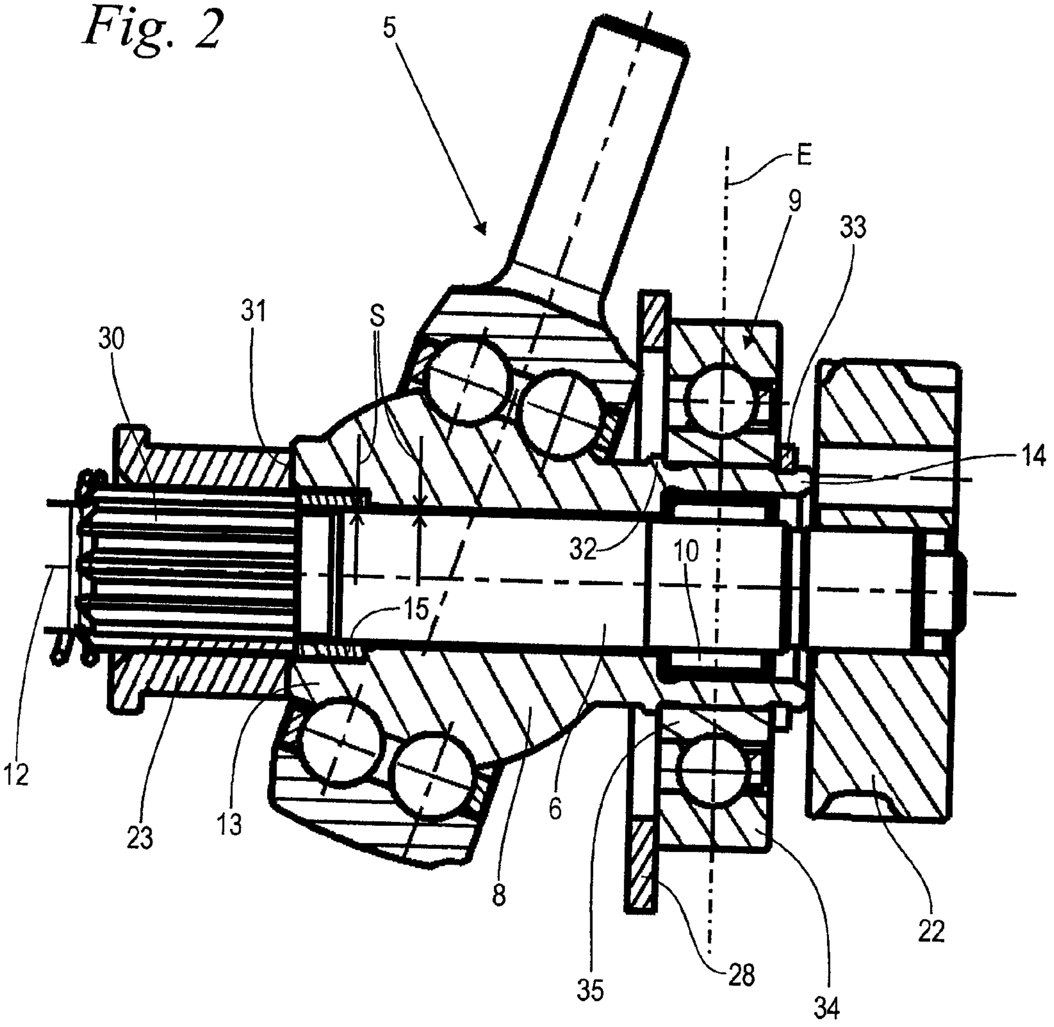
FIG. 2 is a detail view of the swash plate drive supported in the gear housing according to FIG. 1 with the countershaft supported in the swash plate drive.

FIG. 2 shows a detail illustration of the arrangement according to FIG. 1 in the area of the countershaft 6 and the swash plate drive 5. The hub 8 of the swash plate drive 5 is configured as a tubular sleeve that surrounds the countershaft 6 coaxially. The first bearing 9 is arranged on the end 14 of the hub 8 facing the gear 22. The first bearing 9 is a radial bearing in the form of a grooved ball bearing. In addition to receiving radial loads, this grooved ball bearing can receive also axial loads as well as tilt loads. An inner ring 35 of the first bearing 9 is seated externally on the end 14 of the hub 8 and is secured axially to prevent it from sliding by a shoulder 32 and, in the opposite direction, by spring ring 33. When looking also at FIG. 1, it can be seen that the outer ring 34 of the first bearing 9 is non-slidably secured by a holding ring 28 in a bearing seat of the inner housing 21. As a whole, a fixed bearing is provided that supports, in radial, axial, and tilt directions, the axial end 14 of the hub 8 in a cantilever arrangement.

A further support of the hub 8 is neither required nor provided.

The second bearing 10 with which the correlated end of the countershaft 6 is supported within the hub 8 is embodied as a needle bearing but can also be a rolling bearing of a different kind or a sliding bearing. The first bearing 9 and the second bearing 10 are arranged in a common plane E that is perpendicular to the axis of rotation 12 of the countershaft 6.

Adjacent to the opposite cantilevered end 13 of the hub 8, the countershaft 6 is provided with an outer toothing 30 on which the coupling sleeve 23 provided with a matching inner toothing is fixedly secured for common rotation but so as to be slidable parallel to the axis of rotation 12. On the end face that is facing the cantilevered end 13 of the hub 8, the coupling sleeve 23 is provided with claws 31, not illustrated in detail; the claws, as needed, can be brought into engagement with matching recesses provided on the facing end face of the hub 8 so that a rotary connection between the countershaft 6 and the hub 8 is produced. The outer toothing 30 has formed on its end face facing the hub 8 an annular projection that rests against an axial bearing 15 supported on the free cantilevered end 13 of the hub 8 so that the countershaft 6 is axially supported in the direction of the axis of rotation 12.

In the radial direction perpendicular to the axis of rotation 12, the countershaft 6 is supported by the second bearing 10 relative to the hub 8 of the swash plate drive 5. Outside of the second bearing 10, the hub 8 has a continuous radial play s relative to the countershaft 6. This radial play s is provided also in the area of the axial bearing 15. The play s is sized such that a contact between the countershaft 6 and the hub 8 as a result of operation-caused elastic deformations in the different bearings 9, 10, 11, in the hub 8, and in the countershaft 6 is prevented. In the decoupled state of the claws 31, an accidental rotation of the hub 8 together with the rotating countershaft 6 and, moreover, wear between the two components are reliably prevented.

The specification incorporates by reference the entire disclosure of German priority document 10 2007 001 494.7 having a filing date of Jan. 10, 2007.

While specific embodiments of the invention have been shown and described in detail to illustrate the inventive principles, it will be understood that the invention may be embodied otherwise without departing from such principles.

What is claimed is:

1. A hand-held hammer drill comprising:
- a housing;
- a tool spindle rotatingly driving a tool;
- a hammer action percussion-driving the tool;
- a swash plate drive driving the hammer action;
- a countershaft driving as needed the tool spindle and the hammer action;
- a first bearing;
- an axial bearing;
- wherein the hub is rotatably supported in a cantilevered arrangement by the first bearing in the housing and coaxially surrounds the countershaft;
- wherein the hub has a free cantilevered end and the axial bearing is disposed on the free cantilevered end, wherein the axial bearing axially supports the countershaft and has radial play relative to the countershaft.

2. The hammer drill according to claim 1, wherein the first bearing is a grooved ball bearing embodied as a fixed bearing.

3. The hammer drill according to claim 1, further comprising a second bearing, wherein the countershaft is rotatably supported by the second bearing in the hub of the swash plate drive.

4. The hammer drill according to claim 3, wherein the first bearing and the second bearing are arranged in a common plane that is positioned perpendicularly to an axis of rotation of the countershaft.

5. The hammer drill according to claim 3, wherein the hub of the swash plate drive has a continuous radial play relative to the countershaft outside the second bearing.

6. The hammer drill according to claim 1, wherein the housing is a gear housing in which the swash plate drive and the countershaft are housed.

* * * * *